Oct. 26, 1948.                R. L. MAYRATH                2,452,064
              MULTIPLE MOTOR SPEED SYNCHRONIZING BALANCING DEVICE
Filed July 26, 1944                                    2 Sheets-Sheet 1
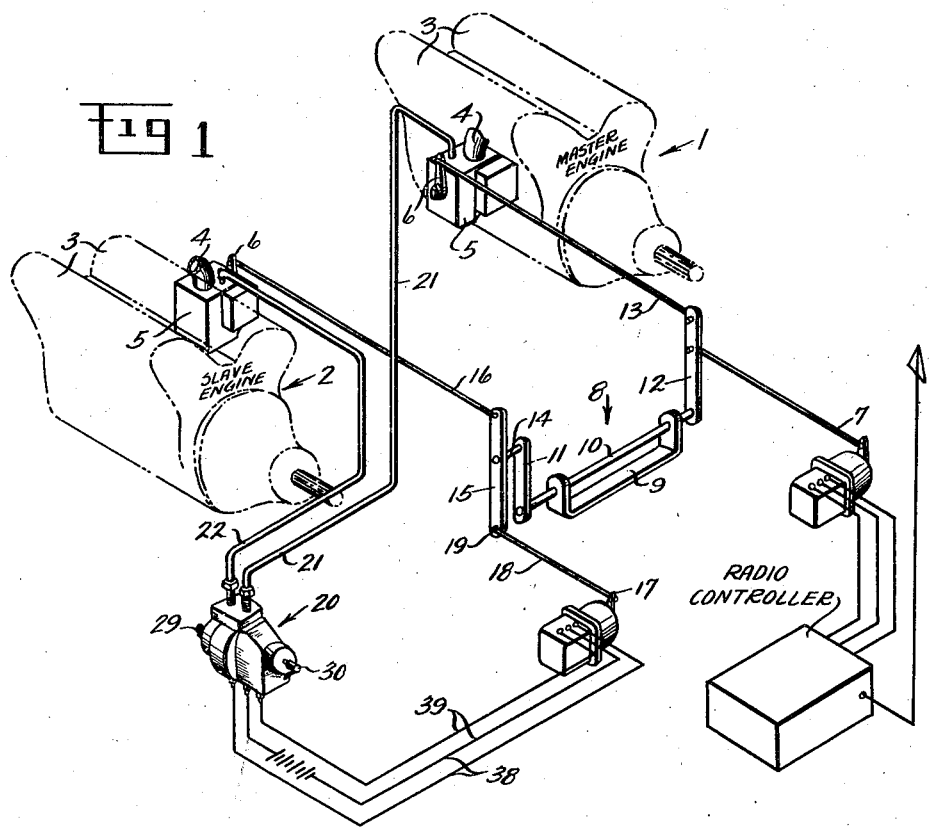
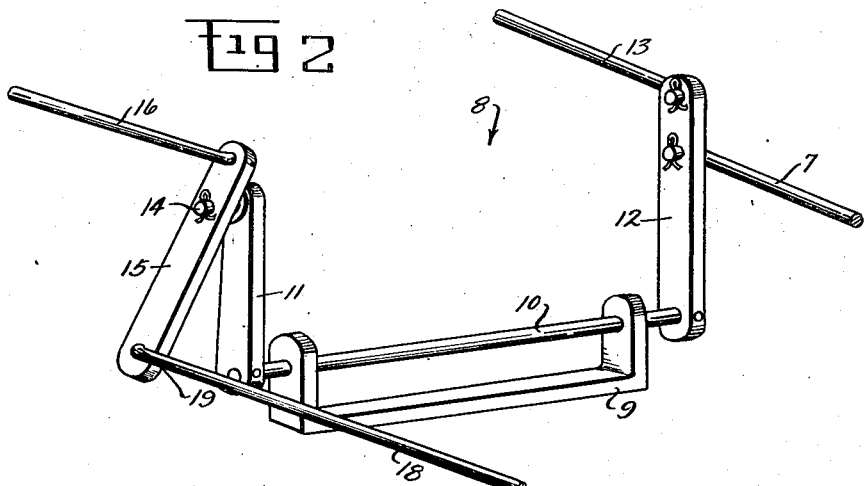
INVENTOR.
ROBERT L. MAYRATH
BY
ATTORNEYS

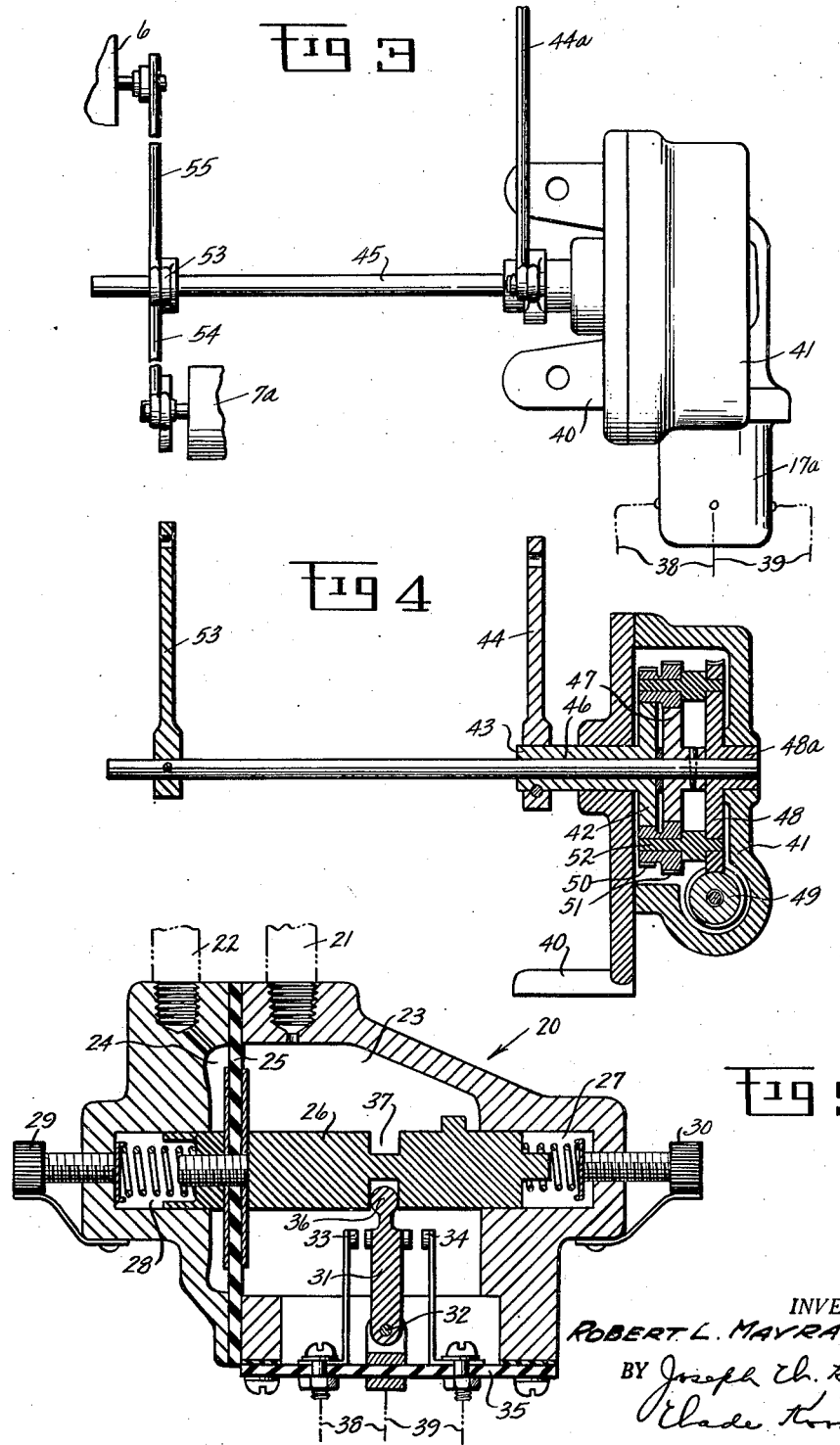

Patented Oct. 26, 1948

2,452,064

UNITED STATES PATENT OFFICE 2,452,064

MULTIPLE MOTOR SPEED SYNCHRONIZING BALANCING DEVICE

Robert L. Mayrath, Dodge City, Kans.

Application July 26, 1944, Serial No. 546,727

7 Claims. (Cl. 60—97)

(Granted under the act of March 3, 1883, as amended April 30, 1928; 370 O. G. 757)

The invention described herein may be manufactured and used by or for Government for governmental purposes, without the payment to me of any royalty thereon.

This invention relates to improvements in control balancing means for operating a plurality of control devices in synchronism, and more particularly, to a control device and system for variably controlling the uniform operation of a plurality of prime movers by the operation of one of the prime movers.

An object of the present invention is the provision of improvements in controlling means for the internal combustion engines of multiengine vehicles or crafts, such as airplanes and the like, in which the speed and performance of one of the engines controls the speed and performance of the other engines through variations in the intake manifold pressures between a control engine and the engines to be controlled thereby.

A further object is the provision of means for varying the speed of the controlling or master engine and interconnected means for simultaneously varying the speed of the controlled or slave engine to maintain the speeds of the engines substantially equal to each other during the throttle adjustment of the controlling engine, and supplemental means to bring the speed of the controlled engine to that of the controlling engine by the relative variations in the manifold suction pressures between the two engine suction manifold pressures.

A still further object is the provision of a plurality of interconnected shiftable controls for a controlling or master engine and a controlled or slave engine whereby operation of the controls of the master engine actuates the controls of the slave engine to bring the speed of the slave engine to approximately the speed of the master engine, and an interconnected control device operable by variations in the manifold suction pressures between the controlling and controlled engines for bringing the speed of the slave engine or engines to that of the master engine.

Another object is the provision of adjusting means for adjusting the speed of a controlled or slave engine with respect to the speed of a controlling or master engine while under control of the manifold suction pressure synchronizing means.

Other objects and advantages of the invention will become more apparent from the following description taken in connection with the accompanying drawings in which like reference characters refer to like parts in the several figures.

In the drawings:

Fig. 1 is a schematic diagram disclosing my improved speed synchronizing control system as applied to a multiengine power plant.

Fig. 2 is an enlarged perspective view of one form of differential movement producing means employed in my synchronizing system.

Fig. 3 is a top plan view of a slightly modified type of differential movement producing means for actuating the throttle controls of a plurality of engines.

Fig. 4 is a horizontal sectional view taken through the control actuating device as shown in Fig. 3.

Fig. 5 is a longitudinal sectional view through a differential pressure balancing control device employed in my system, operated by the variations in intake manifold pressures between the master and slave engines.

In the operation of radio controlled multiengine aircraft and the like, it is desirable to have all of the engines operating at the same speed and intake manifold pressures; however, when maneuvering an airplane, it is often necessary to move or cause the engine controls to be moved faster than the engines and propellers can respond. In the case where the speed of one engine is controlled solely by the speed of the other engine, such as where the speed of one engine is controlled solely by the intake manifold suction pressure in the intake manifold of the other engine, the lag of the master engine behind its controls will cause a still greater lag in the response of the slave engine; due to the slow change in speed and manifold pressure of the master engine.

In order to keep the engines synchronized at all times it is desirable to shift the controls of the slave engine as the controls of the master engine are shifted, without waiting for the automatic synchronizing device to operate. This control maintains the engines in at least approximate synchronized relation at all times, especially during a quick change in the speed of the master engine; and my improved control system, including an associated manifold pressure suction operated device, will function immediately to correct any slight variation in speed of the controlled engine or engines to immediately bring the speed thereof to the speed of the controlling or master engine.

Referring more particularly to Fig. 1 of the drawings, the numeral 1 indicates a "master" or speed controlling engine and 2 indicates a "slave" or controlled engine. Each of these engines is of the conventional internal combustion type having the usual cylinder blocks 3, intake manifolds 4 for introducing fuel into the cylinders from the fuel supply devices or carburetors 5 under the control of the throttle valves 6. Operation of the pistons within the cylinders produces a substantially predetermined suction pressure within the intake manifold 4 of each engine, depending upon the speed of the engine and the position of the throttle valve. A servomotor or other control device 7 is provided for adjusting the throttle valve 6 of the master engine 1 and for simultaneously shifting a differential movement producing device indicated generally at 8 and shown in detail in Fig. 2. The differential movement producing device comprises a fixed support 9 carrying a rock shaft 10 journaled thereon, and a pair of spaced levers 11 and 12 are fixed thereto.

The servomotor or control device 7 is connected to the lever 12 so as to adjust the position of the same, and a link connection 13 connects this lever 12 to the throttle 6 of the master engine 1. Operation of the servomotor 7 may be accomplished in any suitable well-known manner, either manually or by remote radio control to adjust the speed of the master engine.

The lever 11 carries a pivot pin or crank arm 14 projecting from the end portion thereof. A second lever 15 is pivoted intermediate its ends on the crank arm 14 of the first-mentioned lever 11. The throttle valve 6 of the slave or controlled engine 3 is connected to the upper end of the second lever 15 by a link connection 16. The connections between the link 13 and lever 12, and the link 16 and lever 15 are substantially the same distance from the axial center of the rock shaft 10 so that movement of the lever 12 will shift the link connections 16 and 13 equally to produce simultaneous and equal throttle valve actuations for the master and slave engines, assuming that the lever 15 has no movement relative to the lever 11.

A balancing servomotor 17 is provided for actuating the second lever 15 independently of its unitary movement with the lever 11. The servomotor 17 operates an actuating rod 18, connected at 19 to the lower end of the lever 15, at a distance from the crank arm 14 equal to the distance from this crank arm to the axis of the rock shaft 10. Operation of the servomotor 17 therefore shifts the throttle valve 6 of the controlled engine 2 independently of any movement of the throttle valve 6 of the controlling or master engine 1.

The linkage arrangement of the second lever 15 on the lever 12 forms differential movement producing means for the throttle valve 6 of the slave engine 2 with respect to the throttle valve 6 of the master engine 1. When the servomotor 7 is actuated to shift the control lever 12 the lever 11 and the second lever 15 are simultaneously shifted to actuate the throttle valve 6 of the controlled engine 2. The actuation of the servomotor 17 rocks the lever 15 on the lever 11 to produce a differential movement for independent adjustment of the throttle 6 on the controlled engine 2.

The servomotor 17 is reversibly controlled by a differential pressure operated balancing device indicated generally at 20 in Fig. 1 of the drawings and shown in detail in Fig. 5. This differential pressure operated balancing device balances the suction pressure in the intake manifold of the master engine 1 against the suction pressure in the intake manifold of the slave engine 2 at all times.

Conduits 21 and 22 establish communication between the intake manifolds 4, 4 of the respective master and slave engines 1 and 2 and suction chambers 23 and 24 at opposite sides of a flexible partition or diaphragm member 25 located within the casing of the balancing device 20.

The diaphragm 25 has secured thereto an axially movable plunger 26 mounted to slide in guideways 27 and 28 in the ends of the suction chambers 23 and 24.

Adjustable tensioning means are provided as indicated at 29 and 30 for applying predetermined opposing yieldable pressures to the opposite ends of the plunger 26. These adjusting means each comprise a thumbscrew threaded through each end of the housing carrying a spring supporting plate having a coil spring positioned thereon engaging each end of the plunger.

A contact lever 31 is pivoted at 32 on a supporting member carried on the interior wall of the housing 23 to engage one or the other of a pair of spaced contacts 33 and 34 carried on an insulated closure plate 35 in the bottom of the housing 23. The lever 31 has a cylindrically shaped actuating extension 31 projecting into an annular groove 37 formed in the movable plunger 26. Differential pressures in the intake manifolds of the engines cause the diaphragm 25 to be flexed either to the right or left, depending upon which of the conduits 21 or 22 contains the greater pressure.

Axial movement of the plunger 26 from the position shown in Fig. 5 closes one or the other of the control circuits indicated at 38 and 39 for actuating the servomotor 17 to rock the second lever 15, actuating the throttle 6 of the slave engine 2.

In describing the operation of the preferred form of my invention, the servomotor 7 is shifted to simultaneously vary the speed of the master and slave engines 1 and 2. This is accomplished by rocking of the lever 12 which actuates the throttle valve 6 for the master engine and simultaneous movement of the lever 11 carrying the second lever 15. Since the servomotor for the differential pressure synchronizing means 20 is stationary, the end 19 of the lever 15 is fixed and the lever 15 moves in unison with the levers 11 and 12, causing the throttle device 6 of the slave engine 2 to be moved simultaneously and to substantially the same degree as the throttle device of the master engine 1. Any variation in the suction pressures in the intake manifolds 4 of the master and slave engines 1 and 2 is communicated to the opposite sides of the diaphragm 25, causing the plunger 26 to close one or the other of the contacts 33 or 34 controlling the operating circuits 38 and 39 for the balancing servomotor 17. Operation of this servomotor rocks the lever 15 independently of the levers 11 and 12 to adjust the throttle valve 6 of the slave engine 2 in predetermined ratio to the pressure differential in the intake manifolds of the two engines as communicated to the opposite sides of the diaphragm 25 through the conductors 21 and 22.

From the foregoing it will be observed that adjustment of the master engine by the control actuating device or servomotor 7 causes a simultaneous adjustment of the throttle device for the slave engine 2, and any variations between the speed of the slave engine and the master engine either during this speed adjustment of the master engine or thereafter is immediately corrected by the variations in the pressures in the intake manifolds of the respective engines.

Referring now to Figs. 3 and 4 of the drawings, which disclose a somewhat modified differential movement producing means, the reference numeral 40 indicates a fixed support forming the closure and support for a gear casing 41. The support 40 carries rotatably journaled therein a spur gear 42 formed with a hub extension 43 on which is fixed an actuating lever 44 adapted to be connected by a connection 44a to the throttle valve 6 of the controlled or slave engine 2. A shaft 45 is journaled in a bore 46 extending through the gear 42 and hub extension 43. This shaft 45 carries fixed thereon, within the casing 41, a spur gear 47 of slightly smaller diameter than the spur gear 42 and disposed adjacent to the face thereof. A worm gear 48 is journaled within the casing on the shaft 45 and carries a hub extension 48a fitting into a suitable bearing in the gear casing 41. This gear is driven by a worm 49 disposed on the operating shaft of the balancing servomotor 17a, which corresponds to the balancing servomotor 17 in Fig. 1.

The worm gear 48 is larger in diameter than the spur gears 42 and 47 and carries pairs of planetary gears 50 and 51, each journaled on a stub axle shaft 52 projecting from the face of the worm gear 48. The planetary gears 50 and 51 are fixed to each other and mesh respectively with the spur gears 42 and 47.

An actuating lever 53 is fixed to the operating shaft 45 and has an operating connection 54 with the speed control servomotor 7a or other throttle operating device, which corresponds to the servomotor 7 in Fig. 1, and a second operating connection 55 to the throttle valve 6 of the master engine 1.

The balancing servomotor 17a which drives the worm 49 is reversibly controlled in the same manner as the reversible servomotor 17 in the preferred embodiment of my invention. In other words, it is connected in the two operating circuits 38 and 39, which are energized incident to variations in the intake manifold pressures between the master and slave engines 1 and 2. Both servomotors preferably include a reduction gear train, or other control device, so as to hold the operating connections to the levers 15 and 12 in Fig. 1, or the levers 53 and 44 in Figs. 3 and 4, stationary when the servomotors are at rest, since one of these servomotors functions as a lever holding means or leverage anchor for producing the relative movement of the other or second lever means.

In the operation of the invention, incorporating the differential movement producing means shown in Figs. 4 and 5 when the servomotor 7a is actuated to shift the throttle control 6 on the master engine 1, the rock shaft 45 is rotated by the lever 53 which is also connected to the servomotor 7a.

The gear 47 fixed to the shaft 45 is rotated, rotating the twin gears 50 and 51 which now rotate around the stub axle 52, held stationary, due to the fact that the servomotor 17a is not in operation and holds the worm gear 48 carrying the stub axles 52 against rotation. Since the twin gears 50 and 51 are of different diameters, rotation of the gear 47, meshing with the gear 51, causes a differential rotation of the gear 42, meshing with the gear 50, carrying the actuating lever 44 connected to the throttle valve 6 of the slave engine 2. The throttle valves 6 of the master and slave engines 1 and 2 are thus simultaneously adjusted, but not to the same extent, since the throttle valve to the slave engine is not moved as far in this form of the invention as the throttle valve of the master engine 1. However, by spacing the connection between the lever 44 and its connection to the throttle valve 6 of the slave engine a greater distance radially from the axis of the rock shaft 45 than the connection between the valve of the master engine and the lever 53, the throttles of both engines may be adjusted to the same degree.

Should any variation in the speeds between the two engines occur, a corresponding variation in the intake manifold suction pressures will be present. This will cause the differential pressure operated control device 20 to function as before described, closing one or the other of the control circuits 38 or 39, which causes the servomotor 17a to rotate the worm gear 48 in one direction or the other. This effects a planetary movement of the twin gears 50 and 51 with respect to the gear 47 which is maintained against any additional adjusting movement by the control servomotor 7a. Rotation of the gear 48 therefore produces a differential movement of the gear 42 and the lever 44 actuated thereby and connected to the throttle 6 of the slave engine 2, and the speed of this engine will be either increased or reduced, as the case may be, until the speed thereof is synchronized in a predetermined ratio to the intake manifold suction pressures between the two engines.

From the above description it will be observed that my improved control system provides means for positively controlling the speed of a master engine either directly or by any suitable remote control means, and simultaneously shift the throttle means of one or more slave engines so that the speeds of all the engines may be adjusted at will and maintained substantially synchronized, and the system also includes means for keeping all engine speeds absolutely synchronized at all times in a predetermined ratio to the intake manifold suction pressures between the engines, with means for adjusting the speed of the slave engine or engines by varying the effective balance of the intake manifold suction pressures in the differential pressure control means 20 by the manipulation of one or the other or both of the adjusting means 29 and 30 forming a part of this last-mentioned differential pressure control means.

Having thus described my invention, I claim:

1. An engine synchronizing device for adjusting and synchronizing the speeds of a pair of internal combustion engines, said synchronizing device comprising a pair of engine speed adjusting levers disposed for swinging movement about a common center, means for mounting one of said levers for swinging movements independently of the other lever, interconnecting means between the levers for shifting said levers together about said common center, operating connections from the ends of said levers remote from the common center and adapted to be connected to the throttle valves of the internal combustion engines to simultaneously shift the same when said levers are simultaneously shifted by said interconnecting means, and means for shifting one of said levers independently of the other lever comprising a differential pressure actuating device connected to said independently shiftable lever, having differential pressure supply means therefor adapted to be connected to the intake manifolds of the two combustion engines for supplying the differential pressures from the engine intake manifolds in accordance with the relative difference in speeds of the engine.

2. An engine speed synchronizing device for a pair of internal combustion engines to control and synchronize the speeds thereof, said synchronizing device comprising a support, a shaft journalled thereon, an actuating lever fixed on one end of said shaft, a first lever fixed to the other end of said shaft, a centrally pivoted second lever pivoted on the first lever at a point radially spaced from the axis of the shaft, an operating connection secured to the second lever at a point concentric to the axis of the shaft, separate operating connections secured respectively to said first and actuating levers at points radially distant from the axis of said shaft, said operating connections adapted to be connected to the throttle valves of the internal combustion engines for selective actuation thereof, means for adjustably holding and rocking said second lever on its pivot on the first lever to adjust the internal combustion engine throttle valve when connected thereto, including means for shifting the second lever on the first lever in predetermined ratio to variations in the speeds of the engines to bring said engines into synchronized speed relation.

3. An engine speed synchronizing device for a pair of internal combustion engines to control and synchronize the speed thereof, said synchronizing device comprising a support, a shaft journalled thereon, an actuating lever fixed on one end of said shaft, a first lever fixed to the other end of said shaft, a centrally pivoted second lever pivoted on the first lever at a point radially spaced from the axis of the shaft, an operating connection secured to the second lever at a point concentric with the axis of the shaft, separate operating connections secured respectively to said first and second levers at points radially distant from the axis of said shaft, said operating connections adapted to be connected to the throttle valves of the internal combustion engines for selective actuation thereof, means for adjustably holding and rocking said second lever on its pivot on the first lever to adjust the internal combustion engine throttle valve that is adapted to be connected thereto, including differential pressure operated means adapted to be connected respectively to the intake manifolds of the internal combustion engines for shifting the second lever on the first lever in predetermined ratio to variations between the intake manifold suction pressures of the two engines to bring the engines in speed synchronized relation when the pressures in the differential pressure operated means are substantially balanced.

4. A speed synchronizing apparatus for a pair of conventional internal combustion engines, said speed synchronizing apparatus comprising a support, an actuating first lever pivoted on the support, an operating connection from said first lever adapted to be connected to the speed control means of a first one of the engines to control the speed thereof, a second actuating connection for shifting said first lever to adjust the speed of the first engine, a second lever pivoted intermediate its ends to said first lever at a point eccentric from the first lever's pivot, differential pressure operated actuated means having differential pressure supply means adapted to be connected to the intake manifolds of the engines for rocking said second lever on the first lever incident to variations between the intake manifold suction pressures in the intake manifolds of the first and a second one of the engines, including an operating connection actuated by said differential pressure operated actuated means connected to the end of said second lever at a point adjacent the pivot of the first lever on the support to rock the second lever, and a speed controlling connection between the other end of the second lever adapted to be connected to said speed controlling means of the second engine to control the speed thereof relative to the speed of the first engine in predetermined ratio to the differential pressures in the intake manifolds of the two engines.

5. A speed synchronizing apparatus for a plurality of conventional internal combustion engines each having a throttle valve controlled fuel intake manifold means subject to engine intake suction pressures, said speed synchronizing apparatus comprising a support, a first gear journaled on said support having throttle valve control actuating means operable thereby adapted to be connected to the throttle valve of a first one of the engines to control the speed thereof, a second gear rotatable concentrically and independently with respect to said first gear, differential pressure operated control means for selectively rotating said second gear in one direction or the other direction upon opposite variations of differential pressures in said differential pressure operated control means from a predetermined balanced pressure therein, twin planetary gears of different diameters fixed to each other and freely journaled on said second gear with one of said twin gears disposed in driving relation with said first gear, a third gear concentrically rotatable with respect to the axes of said first and second gears and disposed in driving relation with the other of said twin gears, an operating connection actuated by the third gear, adapted to be connected to the throttle valve of the speed synchronizing engine for positively adjusting the throttle of that engine to regulate the speed thereof and simultaneously, through the twin gears rotate the first gear to adjust the speed of the engines to be controlled, said twin gears being rotatable on their axes on said second gear by rotation of said third gear to cause rotative adjustment of the first gear to adjust the throttle of the engine to be synchronized independently of the throttle adjustment of the synchronizing engine, and differential suction pressure conducting means for establishing differential pressures in said differential pressure operated control means, adapted to be connected to the respective intake manifolds of the speed synchronizing engine and the engine to be synchronized, to cause actuation of the differential pressure control means and means operable by said differential pressure control means to rotate the second gear relative to said first and third gears in a predetermined ratio and direction, incident to variations between the intake manifold suction pressures of the engines to produce planetary movement of said twin gears about said first and third gears and corresponding rotary movement of said first gear with respect to said second gear when the second gear is held stationary to adjust the control connection for the throttle valve of the engine to be synchronized.

6. A multiengine speed synchronizing apparatus for a pair of internal combustion speed controlling and speed controlled engines, said synchronizing apparatus including a differential pressure operated device having opposing pressure chambers adapted to be connected to the intake manifolds of the controlled and controlling engines, an axially shiftable plunger in said device, means for shifting the plunger in opposite direction incident to variations in pressures in said chambers, separate circuit closing contact means movable respectively to circuit closing positions upon axial movement of the plunger in opposite directions, adjustable means for applying predetermined yieldable axial pressure to the opposite ends of the plunger to vary the effective differential pressures on the plunger actuating means, throttle actuating means adapted to be interconnected to the throttle device of the controlling engine for adjusting the throttle device of the controlling engine, including a shiftable actuator, a second actuator shiftably mounted on the first actuator for unitary movement with said first shiftable actuator and for independent shiftable movement with respect to said first shiftable actuator, said second shiftable actuator having actuating connection adapted to be directly interconnected to the throttle device of the engine to be controlled for positively shifting the throttle valve of the engine to be controlled in either direction upon movement of said second actuator in either direction to adjust the speed of that engine, means for shifting said first and second actuators in synchronism to simultaneously actuate the connections for the throttles of the controlled and controlling engines and reversibly shiftable motor actuating means including reversible motor controlled circuits adapted to be selectively closed by said circuit closing contact means, connected to said differential pressure operated device for shifting the second actuator with respect to said first actuator to adjust the actuating connection for the controlled engine for varying the throttle setting of the controlled engine with respect to the throttle setting of the controlling engine in predetermined ratio to the difference in pressures in the differential pressure operated device from the intake manifold suction pressures of the controlled and controlling engines.

7. A speed synchronizing device of the class described, a fixed support, a shaft rotatably carried thereby, a lever secured at one end to the shaft, a control motor connected to said lever for adjusting the position of said lever, a second lever pivoted intermediate its ends to the outer extremity of the first mentioned lever with the inner end of the second lever terminating adjacent the axis of said shaft, an operating connection between the outer extremity of said second lever adapted to be connected to the throttle device of an internal combustion engine to control the speed thereof, reversible motor control means connected to said second lever at the inner extremity thereof for rocking the same in opposite directions on its pivot on the first lever adapted to adjust the throttle device of the engine to be controlled, a second operating connection from said first-mentioned lever adapted to be connected to the throttle device of a speed controlling internal combustion engine to cause simultaneous actuation of the throttle devices of both of the internal combustion engines, a first and second operating circuit for reversibly operating said reversible motor control means, differential pressure operated circuit controlling means including normally open circuit closing means shiftable in one direction to close the first operating circuit to said reversible motor control means to cause the same to rock said second lever in one direction on its pivot on the first lever to increase the speed of the internal combustion engine that is to be controlled, and shiftable in the other direction to close the second circuit to said reversible motor control means to rock said second lever on its pivot in the opposite direction to reduce the speed of the internal combustion engine that is to be controlled, said differential pressure operated circuit closing means including a differential pressure actuated member for moving said circuit closing means reversibly in response to variations in differential pressure, and differential pressure connecting means therefor adapted to be connected to the intake manifolds of the controlled and controlling engines adapted to adjust the speed of the controlled engine to balance the manifold suction pressures between said engines, and adjustable means for varying the relative differential pressures on said pressure actuating member.

ROBERT L. MAYRATH.

REFERENCES CITED

The following references are of record in the file of this patent:

UNITED STATES PATENTS

| Number | Name | Date |
|---|---|---|
| 1,200,051 | Trout | Oct. 3, 1916 |
| 1,784,671 | Jehle | Dec. 9, 1930 |
| 1,867,649 | Brush | July 19, 1932 |
| 2,100,059 | Morehouse | Nov. 23, 1937 |
| 2,104,582 | Carlson | Jan. 4, 1938 |
| 2,124,756 | Staples | July 26, 1938 |
| 2,160,324 | Berges | May 30, 1939 |
| 2,173,913 | Morehouse | Sept. 26, 1939 |
| 2,243,655 | Scott | May 27, 1941 |
| 2,255,753 | Bates | Sept. 16, 1941 |
| 2,261,530 | Strickler | Nov. 4, 1941 |